United States Patent
Estep et al.

(10) Patent No.: US 6,766,481 B2
(45) Date of Patent: Jul. 20, 2004

(54) SOFTWARE SUITABILITY TESTING SYSTEM

(75) Inventors: James L. Estep, Morgantown, WV (US); Mark A. Dehlin, Morgantown, WV (US)

(73) Assignee: West Virginia High Technology Consortium Foundation, Fairmont, WV (US)

( * ) Notice: Subject to any disclaimer, the term of this patent is extended or adjusted under 35 U.S.C. 154(b) by 53 days.

(21) Appl. No.: 10/131,918

(22) Filed: Apr. 24, 2002

(65) Prior Publication Data

US 2004/0015866 A1 Jan. 22, 2004

Related U.S. Application Data

(60) Provisional application No. 60/286,123, filed on Apr. 24, 2001.

(51) Int. Cl.[7] .................................................. G06F 11/00
(52) U.S. Cl. ........................................................ 714/124
(58) Field of Search .......................................... 717/124

(56) References Cited

U.S. PATENT DOCUMENTS 6,405,364 B1 * 6/2002 Bowman-Amuah ......... 717/101
2003/0028856 A1 * 2/2003 Apuzzo et al. .............. 717/124

FOREIGN PATENT DOCUMENTS

JP          08-235024       * 9/1996     ........... G06F/11/28

OTHER PUBLICATIONS

Weyuker, The Evolution of Program–Based Software Test Data Adequacy Criteria, 1988, ACM, p. 668–675.*
Ostrand et al., The Category–Partition Method . . . , 1988, ACM, p. 676–686.*
Hsai et al., Augmenting Data Flow Criteria for Class Testing, Nov. 1997, ACM, p. 1–9.*
Lu, Test Case Generation for Specification–Based Software Testing, Oct. 1994, ACM, p. 1–10.*
Stevens et al., Efficient Software Testing Procols, Nov. 1998, ACM, p. 1–15.
Hsai et al., Class Testing and Code–Based Criteria, Nov. 1996, ACM, p. 1–8.

* cited by examiner

Primary Examiner—John Chavis
(74) Attorney, Agent, or Firm—Steptoe & Johnson PLLC

(57) ABSTRACT

A software suitability testing system using a software product line engineering approach for analyzing and testing commercial, off-the-shelf software products to determine the software product's capabilities. A software product is evaluated and tested against a predefined set of criteria requirements, and the results are published on the World Wide Web. The test results are made available to customers such that the capabilities of a particular software product are readily available to the users and that competing software products can be compared.

14 Claims, 10 Drawing Sheets

SOFTWARE SUITABILITY TESTING SYSTEM

CROSS REFERENCE TO RELATED APPLICATIONS

This application claims the benefit of U.S. Application No. 60/286,123, filed Apr. 24, 2001.

BACKGROUND OF THE INVENTION

1. Field of Technology

This invention relates to systems and processes for testing and evaluating software, and in particular, to a process for testing commercial, off-the-shelf software products to determine functionality for specific criteria and presenting decision making information in an interactive web-based repository.

2. Related Art

In both parallel and as an integral part of the software product line paradigm, the use of commercial off-the-shelf products, as components of larger systems, is becoming increasingly commonplace. Shrinking budgets, accelerating rates of commercial off-the-shelf enhancement, and expanding system requirements are all driving this process. The shift from custom development to commercial off-the-shelf based systems is occurring in both new development and maintenance activities.

A software product line is a set of software-intensive systems sharing a common, managed set of features that satisfy the specific needs of a particular market segment or mission and that are developed from a common set of core assets, including commercial off-the-shelf software, in a prescribed way. In a software product line, a new product is formed by taking applicable components from the base of common assets, using parameterization or inheritance to tailor them as necessary, and using a disciplined process to assemble the collection under the umbrella of a common, product-line wide architecture. Building a new product (system) becomes more a matter of assembly or generation than creation; the predominant activity is integration rather than programming. Software product line engineering allows software system development to be completed faster and at less cost by defining requirements and assets to be used in multiple applications.

In the past, users have been forced to rely on the software manufacturer's company description in order to determine software capabilities. These descriptions are often generic and do not provide the user with information as to specific applications to which the software is capable or not capable. Besides the information provided by manufacturer's packaging or sales literature, there is no other source of information that allows the user to readily assess whether a particular piece of commercial-off-the-shelf software is capable of performing a particular function for the user.

Therefore, the art needs a method for providing users with the necessary data to readily determine whether a particular piece of software will perform a specific function, thereby fitting within the context of the users' specific application(s).

SUMMARY OF THE INVENTION

The present invention is for a software suitability testing system using a software product line engineering approach. The software suitability testing system applies to commercial, off-the-shelf components, or software products, being considered for use in a software product line engineering environment. The system tests software products to determine the software's capabilities. The capability data is then made available to software users such that the applications of a particular piece of software, or a particular software product, are readily available to the users.

A key element in the product line concept is the testing of commercial, off-the-shelf software products to determine whether they are suitable for product line use. The confusion is taken out of the software selection process by testing off-the-shelf software products in an organized manner and presenting decision making information in an interactive web-based repository. The present system focuses on testing software products according to the requirements of a specific product line. This system gives a customer a much more cost effective approach to selecting a software product as compared to testing software products just for a specific system and provides much more meaningful results to the customer than testing a software product for universal usage.

Building systems according to a product line means defining the commonalities and variabilities in a family of software products and building one architecture/infrastructure that can meet those needs. The testing process of the present system begins by working with a chosen product line architect and determining the appropriate testing criteria for the specific components within that product line architecture. The identified criteria is taken and distributed in the software industry for industry review and comment. After all appropriate comments have been incorporated, a sample software product is requested for testing. Throughout the testing process of the software product, the software product vendor or supplier has the opportunity to dispute any of the results before the suitability test report is published. This ensures the accuracy of the results. After the suitability test report is completed, the testing results are placed on the World Wide Web ("Web") where customers can compare software products in a component area against the specific criteria that are important for the system presently being developed.

An aspect of the present invention is that it provides an assessment of components (software products) eligible for inclusion in the base of common assets. This assessment enables a rapid component selection process by a system developer/integrator.

Another aspect of the present invention is that it provides users with data, resulting from the testing process, that allows users to readily determine whether a particular piece of software (or a particular software product) will perform a specific function within the context of a specific application. In addition, users are able to readily and easily compare the suitability of competing software products.

Another aspect of the present invention is that it results in data that describes the capabilities of a particular piece of software, thereby allowing users to simply refer to this data to determine software capabilities.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

A. Software Suitability Testing System Overview

Figure 1:
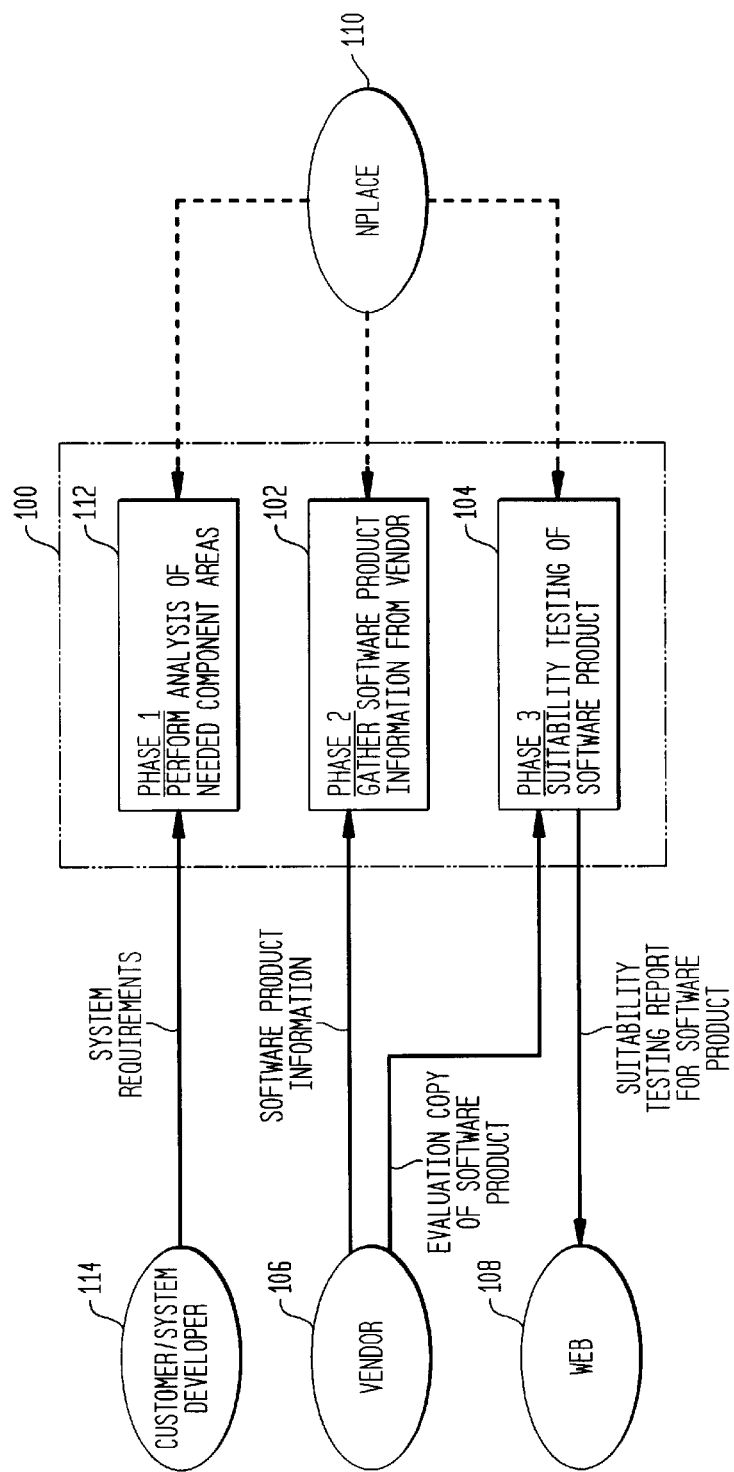
FIG. 1 is a block diagram showing an overview of the software suitability testing system.

The present invention is a software suitability testing system (or system) 100 for evaluating, assessing, and testing a commercial, off-the-shelf software product from a vendor 106 in terms of the suitability of the software product for inclusion in a larger software system or for a specific application. An overview of the system 100 is shown in FIG. 1. In the preferred embodiment, the system 100 is implemented and executed by a testing center such as the National Product Line Assessment CEnter (NPLACE) 110. The use of an NPLACE 110 is for convenience, wherein any person, entity, or sophisticated software program can implement any one or more of the steps of the present software suitability testing system 100.

In this embodiment, the NPLACE 110 determines a component area, or software product line, e.g., word processing or database management systems, to be evaluated, develops any testing protocol when necessary, gathers the appropriate commercial off-the-shelf (COTS) software products for testing, and tests the selected COTS software products. The NPLACE 110 preferably implements or executes the present system 100 in three phases which is shown by the dashed lines on FIG. 1.

In Phase 1 112, the NPLACE 110 receives system requirements from a customer or system developer 114. The system requirements define the functional needs of a target software system that is being designed and implemented. In Phase 1 112, the NPLACE 110 analyzes the system requirements to determine the one or more component areas that are needed for the target software system.

In Phase 2 102, the NPLACE 110 gathers information about a specific software product from a vendor 106 for each of the component areas identified in Phase 1 112. This is preferably accomplished by a vendor 106 completing and submitting a product information form and any associated documentation for the software product to be evaluated. Once the information is received, the software product is scheduled for testing.

In Phase 3 104, the NPLACE 110 requests and receives an evaluation copy of the software product being evaluated. Once it is received, the NPLACE 110 performs suitability testing on the software product, generating a software suitability testing report containing an assessment of the software product in terms of a selected set of criteria requirements against which the software product was tested and evaluated. The vendor 106 has the opportunity to review and comment on a report before it is finalized and published. All finalized reports are posted on a global computer network, e.g., the World Wide Web ("Web") 108, such as at "www.nplace.net," wherein it is accessible by any interested customer 114 or consumer.

Figure 2:
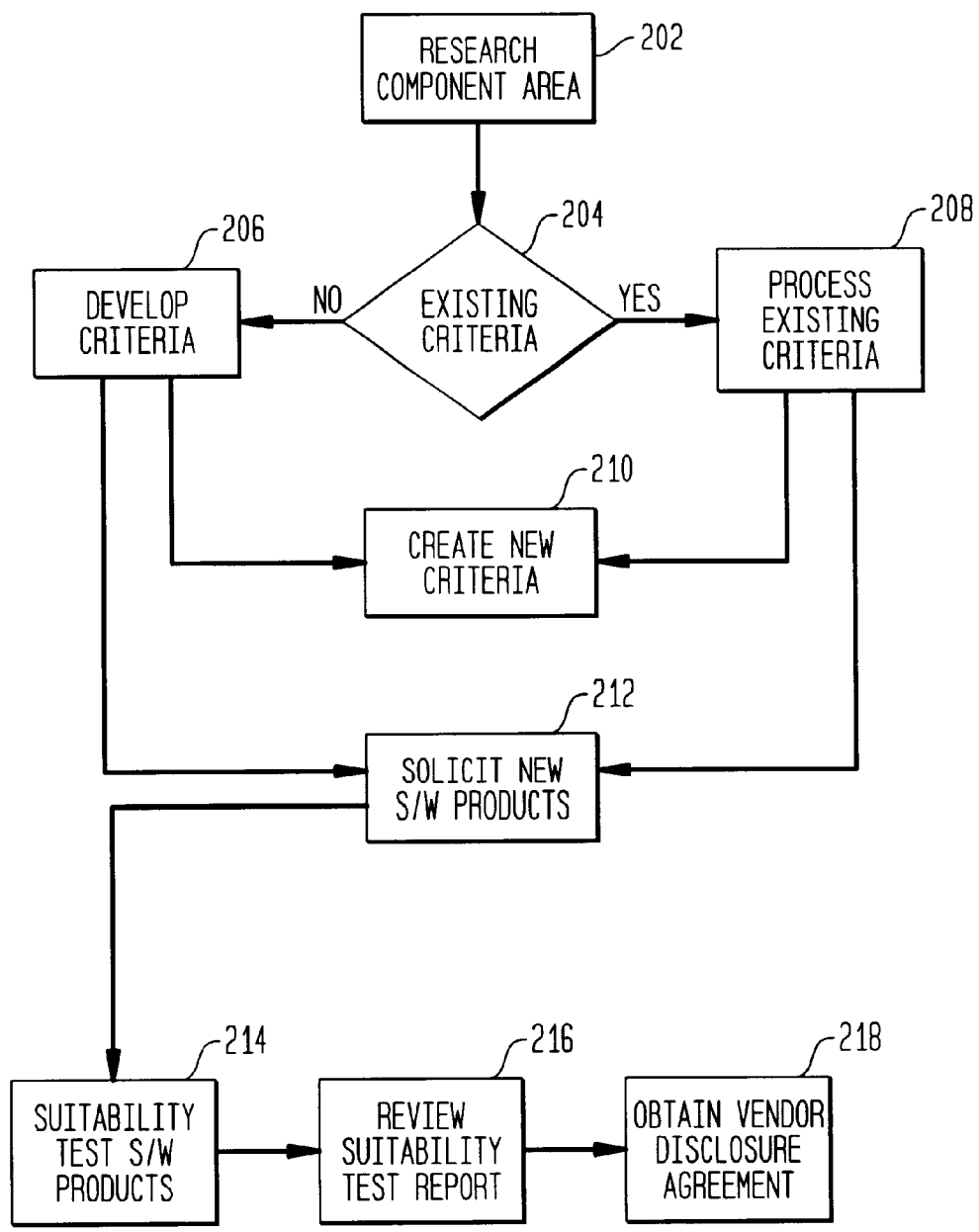
FIG. 2 is a block diagram showing the top level modules of the system.

FIG. 2 shows the top level process modules of the present system 100. Each module is described in detail below. The NPLACE 110 begins the system 100 at step 202—Research Component Area. Specifically, the NPLACE 110 determines the various component areas that make up the architecture of the desired software system. That is, the NPLACE 110 determines which different product lines of software, e.g., word processor or database management system, are needed in the implementation of the target system. In step 202, the NPLACE 110 orders and groups the component areas according to functionality. After step 202, the NPLACE 110 proceeds to step 204—the determination of whether there is existing criteria for a given component area.

In step 204, the NPLACE 110 determines whether criteria requirements already exist for the component area being researched. If no such criteria requirements exist, then the NPLACE 110 proceeds to step 206 to Develop Criteria. If there is existing criteria for the component area, the NPLACE 110 proceeds to step 208 to Process Existing Criteria. In step 206, NPLACE 110, develops criteria requirements from scratch for the component area as needed. In contrast, instep 208, the NPLACE processes any existing criteria, or criteria requirements already identified, for the current component area. During the processing of step 206, and optionally step 208, the NPLACE 110 performs step 210—Create New Criteria. In step 210, brand new criteria requirements for the current component area are identified and developed for use during Phase 3 104 of the system 100.

Once the NPLACE 110 finalizes the criteria requirements for the testing of Phase 2, the NPLACE 110 continues to step 212—Solicit New Software Products. In step 212, the NPLACE 110 contacts vendors 106 having one or more software products in the current component area and requests for their participation in the testing of those identified software products. Continuing to step 214, the NPLACE 110 performs the Suitability Test of the identified Software Products against the identified criteria requirements. The NPLACE 110 generates a suitability test report for each software product tested.

Once the suitability testing is complete, the NPLACE 110 continues to step 216 to Review the Suitability Test Report (Report). In this step, the NPLACE 110 reviews the Report for completeness and accuracy. The NPLACE 110 makes any changes to the Report that are needed. Upon completion of a Report, the NPLACE 110 continues to step 218 to Obtain a Vendor Disclosure Agreement which is when the vendor 106 of the tested software product signs-off on and approves of the contents of the Report, resulting in the Report being posted on the Web 108.

The present system 100 is described in terms of identifying a single component area and selecting and testing a single software product for the component area. This is for convenience purpose only. It would be readily apparent to apply the present system 100 to multiple component areas and to test the suitability of multiple software products.

1. Research Component Area—Step 202

Figure 3:
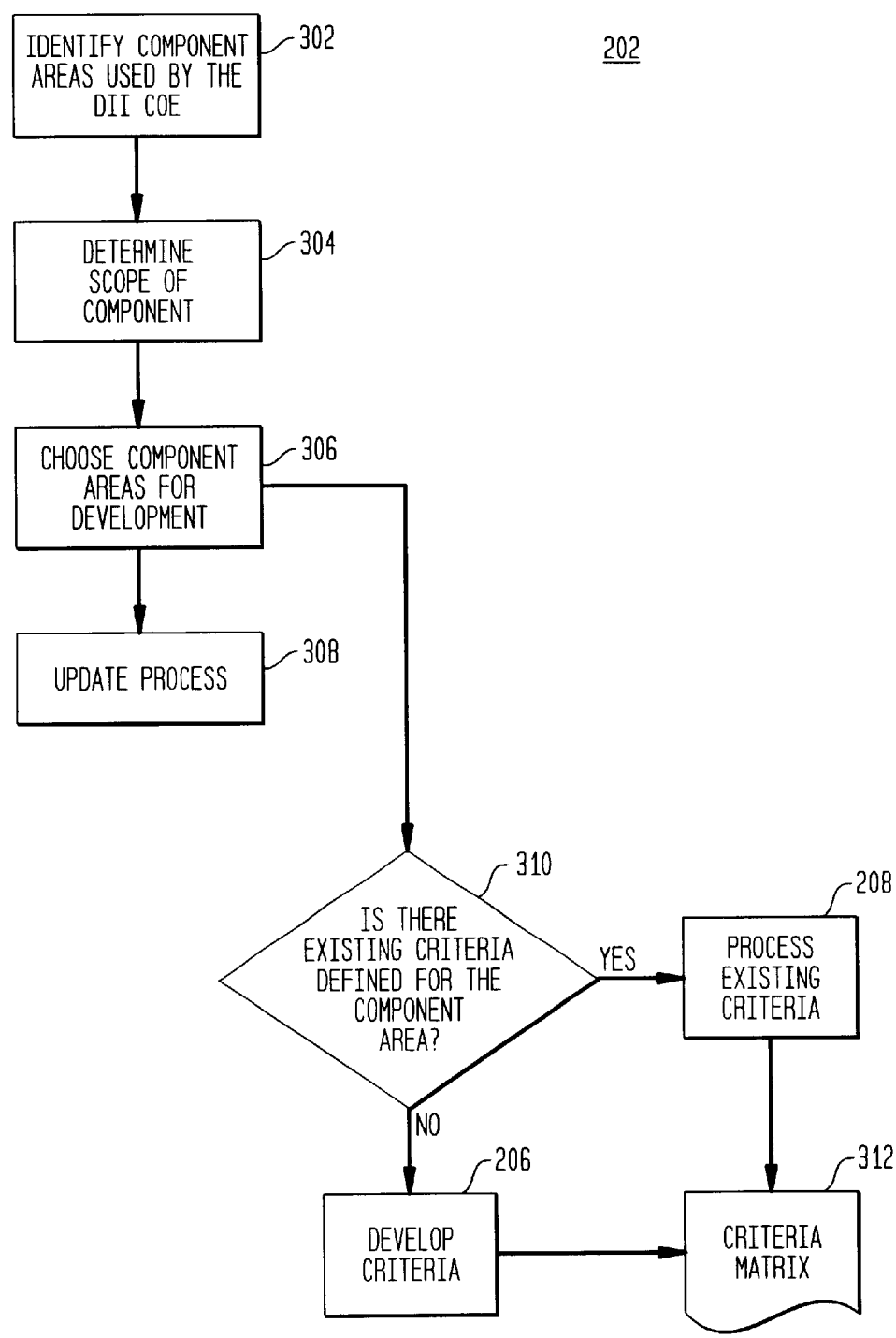
FIG. 3 is a block diagram showing the research component area module.

The research component area module 202 is shown in FIG. 3. In this module 202, an NPLACE 110 customer 114 determines the component areas required for building the target software system. More particularly, the customer 114 determines what software product lines, e.g., word processor, database management system, network management system, etc., are needed to design, develop, and implement a larger, target software system. A clear understanding of the target system architecture and the individual component areas identified within that architecture is necessary. This understanding allows the NPLACE 110 to research the viability of choosing a component area for testing.

In step 202, the NPLACE 110 uses a component criteria development team (CCDT), which is a team of individual members having the appropriate software and engineering experience and background. The CCDT starts at step 302 wherein it inputs and reviews system architecture documentation and system specification documentation, and also communicates with the system developer, in order to gain an understanding of the architecture of the target software system. The CCDT identifies the component area makeup, comprising one or more component areas, of the architecture and notes any lessons learned.

Continuing to step 304, the CCDT develops a clear understanding of the definition, scope and architecture fit for each identified component area so that NPLACE 110 understands the boundaries of these component areas. This understanding is necessary to make the final decision about the appropriateness of each component area as a viable candidate for suitability testing. The CCDT inputs the understanding of the target system architecture and the indentification of the component area makeup of that architecture.

In step 304, the CCDT specifically conducts research of the component areas as individual entities and as part of the Defense Information Infrastructure Common Operating Environment (DII COE) architecture. The CCDT clarifies the component area and discusses any potential research areas (see list below). The CCDT also verifies the understanding of what the component area is. This research is preferably performed using the following tools/resources: Worldwide Web (WWW) for component area information, WWW for product information, system documentation, available software, and any other suitable source.

Other activities performed by the CCDT in step 304 include a determination of how the system architecture can be "split" to accommodate the commercial off-the-shelf (COTS) market because such COTS software may not always fit into the architecture on a one to one basis. Group component areas are based on: 1) what should be tested together, 2) what software products may be bundled together (suites), and 3) what software product is necessary for testing other software products (i.e., report generators need DBMS systems).

Upon completion of step 304, the CCDT provides a detailed description of the identified component areas, a listing of any groupings of component areas for testing purposes wherein the component areas will be understood in relation to the other component areas in the system architecture, and a preliminary list of software products to be tested.

The CCDT continues to step 306 wherein it chooses one or more component areas for which it must develop a set of criteria requirements. One or more component areas may be selected at a time for test protocol (criteria requirements) development. This selection is determined by the customer's 114 needs, the availability of software products, and information for the various component areas. The CCDT inputs a description of component areas and groupings, the relationship between the component areas, and the preliminary list of software products.

In step 306, the CCDT compiles an in-depth listing of COTS software products for each component area, determines a testing environment for each component area, determines resource allocation for a component area based on the status of criteria requirements available for that component area, determines the time frame for testing each component area, analyzes the above information, and schedules component areas for criteria development if not already available. Resulting from the completion of step 306, the CCDT lists the component areas having available criteria requirements, schedules any needed criteria development by component area, and suggests groupings of component areas for criteria development and subsequent testing.

Upon the completion of step 306, the CCDT automatically proceeds to step 308 to update the research component area module 202. In step 308, the CCDT compiles the lessons learned to date and will modify the process as needed based on the lessons learned.

Also upon completion of step 306, the CCDT proceeds to step 310 wherein it determines whether there is existing criteria requirements for a specific component area. If there is no existing criteria, then the CCDT proceeds to step 206 to develop brand new criterial requirements from scratch for that component area. If there is existing criteria, the CCDT proceeds to step 208 to process the existing criteria requirements for that component area. Both steps 206 and 208 are described in greater detail below. Regardless of whether the CCDT performs step 206 or 208, the CCDT completes the research component area module 202 by generating a criteria matrix 312.

2. Develop Criteria—Step 206

Figure 4:
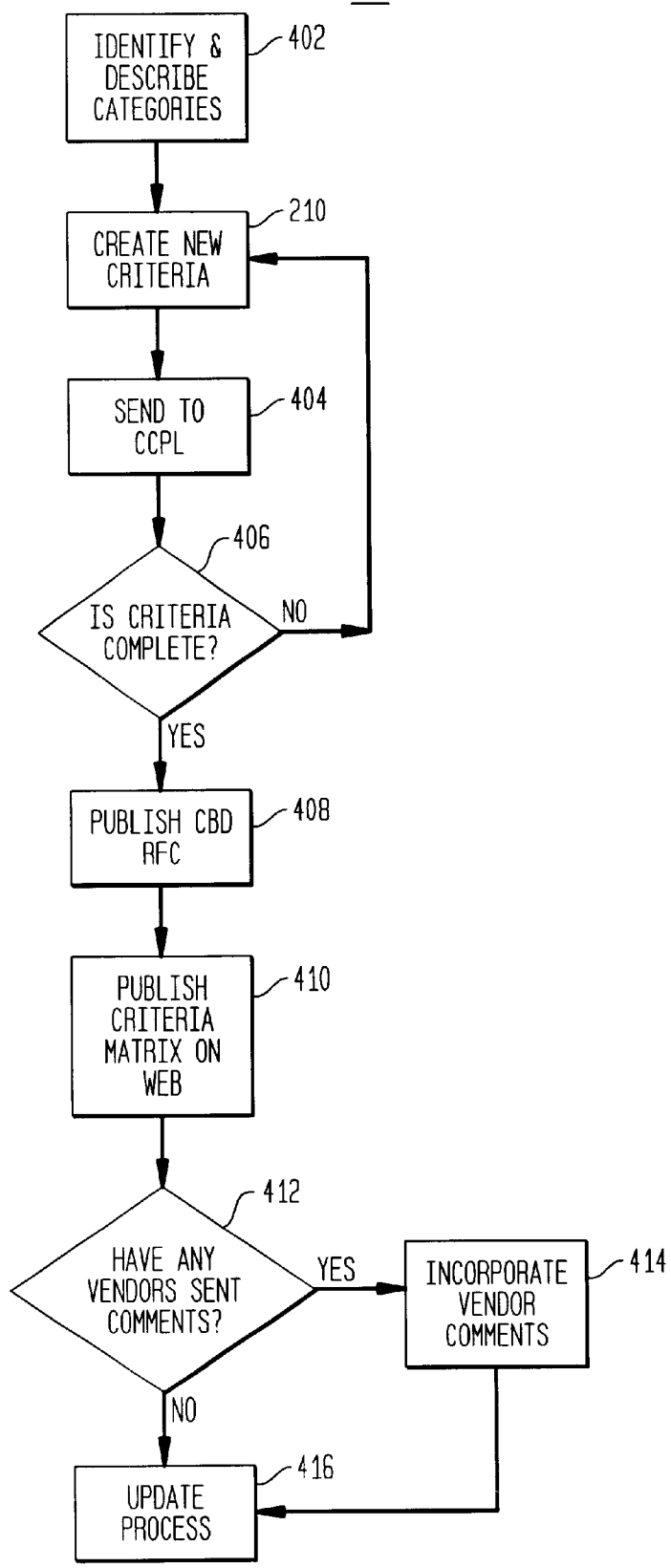
FIG. 4 is a block diagram showing the develop criteria area module.

FIG. 4 is a block diagram showing the develop criteria area module 206. This module 206 is performed when it becomes necessary to develop criteria requirements for a component area from scratch.

Starting at step 402, the CCDT uses the characterization of an identified component area to develop the preliminary categories for criteria organization for that component area. The first category is usually an "across component area" category. The CCDT inputs the detailed description of the component areas, any groupings of component areas for testing purposes wherein the component areas will be understood in relation to the other component areas in the architecture, and a preliminary list of products.

The preliminary category list is preferably based on the results of the research and the categories found in DII COE materials. The criteria requirements are not limited to these preliminary categories, and can be changed as needed. At this point, the preliminary listing is designed to simply provide some organization to the criteria development process. As the categories are created, they will need to be fully defined, to ensure that all team members have a complete and uniform understanding of each category.

The CCDT continues to step 210 to create new criteria requirements, a criteria matrix 312. Step 210 is described in greater detail below. Once the new criteria is created, processing continues to step 404 wherein the CCDT facilitator sends the criteria matrix 312 to the customer 114 for review and comment (usually a two-week process). The customer 114 assists in determining the necessity of each criterion and the completeness of the criteria matrix 312. Continuing to step 406, if the customer 114 returns comments to the CCDT facilitator such that the criteria matrix 312 is not complete, NPLACE addresses those comments by returning to step 210 to create new criteria. If the CCDT facilitator determines in step 406 that there are no comments, then the criteria matrix 312 is complete, and processing proceeds to step 408.

In step 408, the NPLACE 110 center manager writes and publishes a Request for Comment (RFC) on the criteria matrix 312 in the Commerce Business Daily (CBD). This publication usually is a 30 day waiting period. At the same time the criteria matrix 312 is publishes in the CBD, processing continues to step 410 wherein the NPLACE 110 webmaster publishes the criteria matrix 312 on the NPLACE 110 homepage on the Web 108. This is the primary access mechanism for the vendors 106 wherein the publication on the Web 108 solicits comments about the criteria matrix 312 for a specific component area from the vendors 106. Comments can also come at anytime. NPLACE 110 reviews the comments received and, as appropriate, incorporates these comments into the test criteria.

Specifically, processing continues to step 412 wherein the CCDT determines whether a vendor 106 sent any comments regarding the criteria matrix 312. If vendor 106 comments are received, the CCDT proceeds to step 414 wherein the vendor 106 comments are incorporated into the criteria matrix, and if new criteria have to be developed, the CCDT returns to step 210 to develop the new criteria. Once the vendor 106 comments are incorporated, the CCDT proceeds to step 416. If no vendor 106 comments are received in step 412, processing continues to step 416.

In step 416, the CCDT automatically updates the develop criteria module 206. In step 416, the CCDT compiles the lessons learned to date and will modify the process as needed based on the lessons learned.

3. Process Existing Criteria—Step 208

Figure 5:
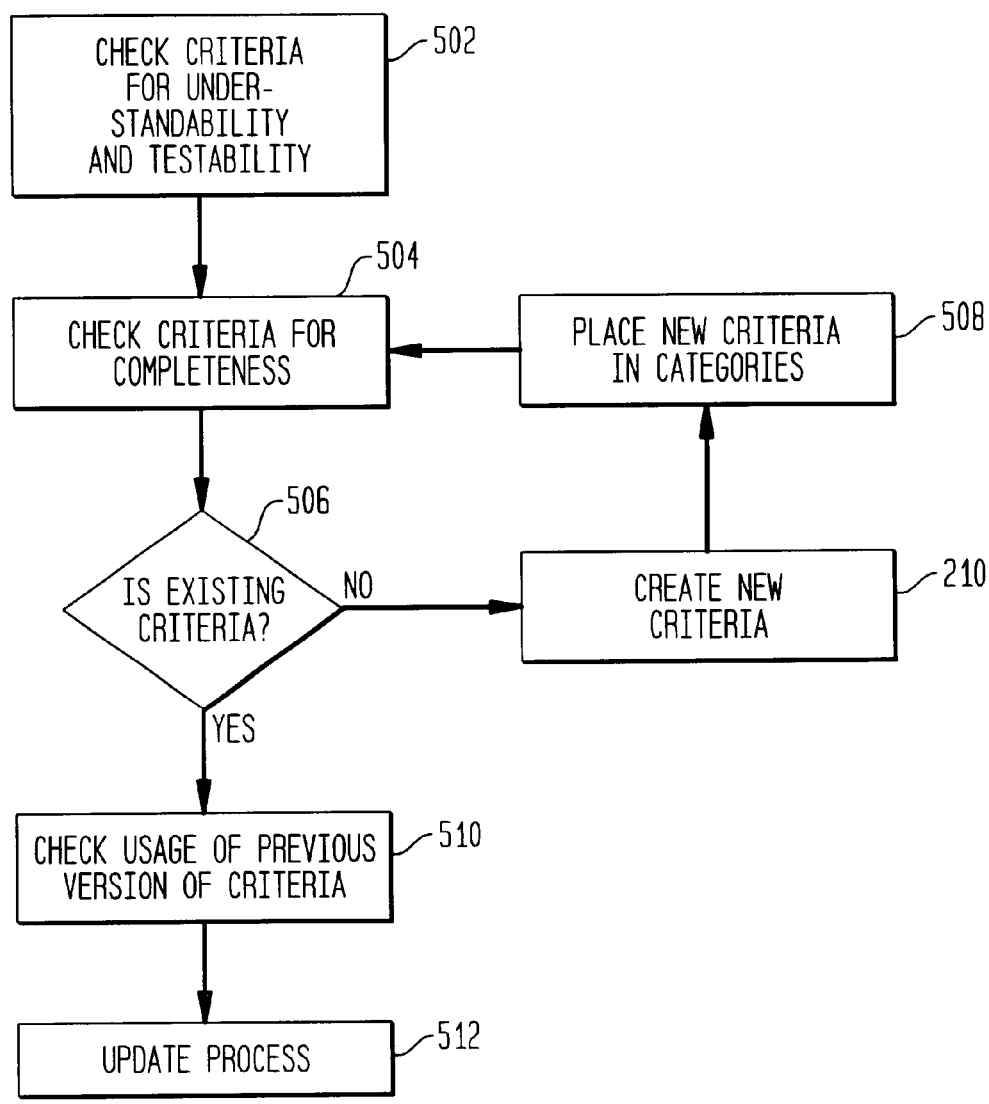
FIG. 5 is a block diagram showing the process existing criteria module.

FIG. 5 is a block diagram showing the process existing criteria module 208. In this module 208, existing criteria can come from two sources: the customer 114 and previously developed NPLACE 110 criteria. This module 208 is also used to evaluate the completeness and viability of the criteria requirements as changes occur in the marketplace and the system architecture.

Processing of the Process Existing Criteria module 208 begins at step 502 wherein the CCDT reviews and checks the criteria understandability and verifies that the criteria can be tested. The CCDT inputs the updated criteria matrix 312 and contacts the source of each criteria requirement to clarify the details about that criteria. If the source can not clarify the criteria within a reasonable amount of time, NPLACE 110 must than clarify the criteria as best it can. All clarifications are transferred to a notes database (such as Lotus Notes) for recordation.

Continuing to step 504, the CCDT checks the criteria matrix 312 for completeness in light of the list of component area software products, system architecture documentation, and system specification documentation. This check is based on changes to the COTS software products that are being considered or have been tested in the past. Changes to the criteria matrix 312 also will be considered. For each suggested change that needs to be incorporated into the criteria matrix 312, the CCDT proceeds to step 506 to determine whether the change in criteria already exists or not.

In step 506, the CCDT determines whether there is existing criteria for completing the criteria matrix 312. If there is no existing criteria, processing proceeds to step 210 wherein new criteria is created. Step 210 is described in greater detail below. Continuing to step 508, the CCDT places any new criteria into the identified categories of the criteria matrix 312. If needed, the CCDT creates and describes any new categories. The CCDT must also check to make sure that the new criteria are not duplications. Duplications can be used instead of or to clarify the original criteria. Processing is then returned to step 504 to allow the CCDT check the criteria matrix 312 for completeness.

Returning to step 506, if the CCDT determines there is existing criteria for the suggested changes, processing proceeds to step 510. In step 510, the CCDT checks the usage of the previous version of the criteria matrix 312 for the software product. The previous version of the software needs to be managed until such time that it will be archived. If software products have been tested using previous criteria, then both versions (previous and current) of the criteria matrix 312 must be maintained on the Web 108. If all software products have been removed from the Web 108 that were tested using the previous criteria matrix 312, then the previous criteria matrix 312 is archived. Processing continues to step 512.

In step 512, the CCDT automatically updates the process existing criteria module 208. In step 512, the CCDT compiles the lessons learned to date and will modify the process as needed based on the lessons learned.

4. Create New Criteria—Step 210

Figure 6:
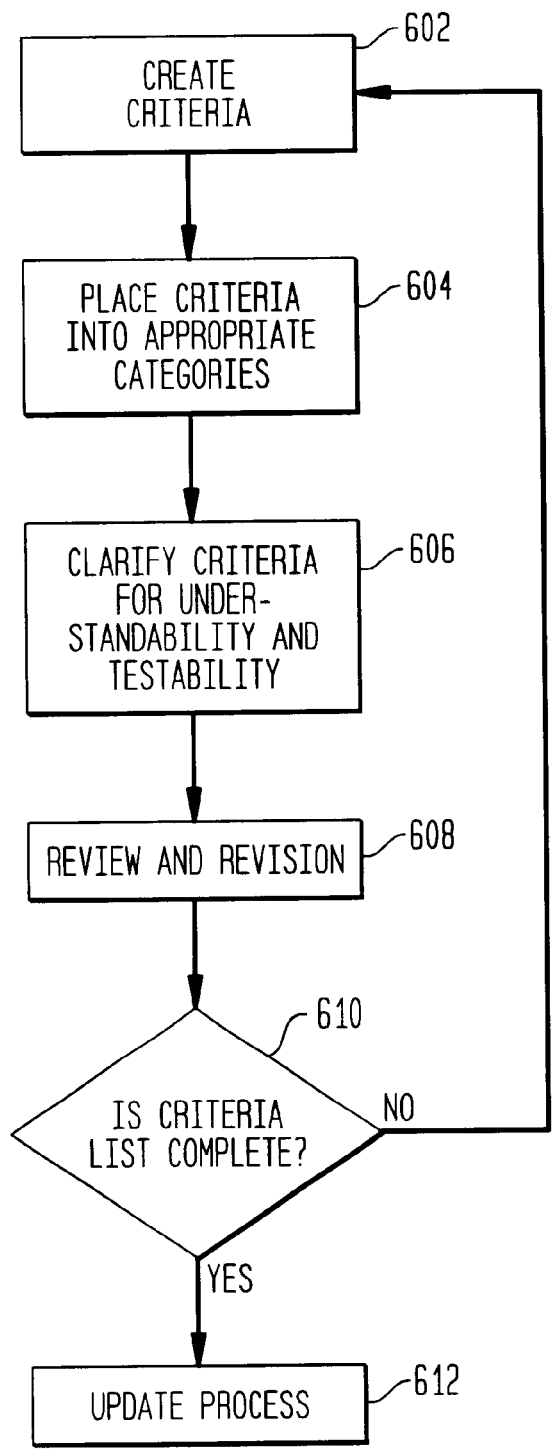
FIG. 6 is a block diagram showing the create new criteria module.

FIG. 6 is a block diagram showing the create new criteria module 210. In this module 210, processing starts at step 602 wherein the CCDT creates a new criteria for inclusion in the criteria matrix 312 for a software product. The criteria is developed based on the component area research module 202 and any specific customer 114 requests. Each criterion requirement preferrably tests one capability of the software product.

In the preferred embodiment, each member of the CCDT is assigned a specific category. Each team member then develops the initial criteria for his/her category(ies). If criteria are found that do not fit into any of the initial categories, they are placed into a "miscellaneous" category. If possible, a criterion that does not fit into an existing category is assigned a new category. Once all members have completed their tasks, the CCDT describes all new categories and subcategories, and compiles potential criteria for team review while documenting each reference source.

Processing continues to step 604 wherein once the criteria has been developed, the CCDT places the criteria into appropriate categories. The CCDT also makes an initial attempt to combine the criteria into a single criteria matrix 312 and checks the criteria for duplication. The test for checking the criteria is the evaluation of functional operation by use of equipment or instrumentation, simulation techniques, and the application of established principles and procedures to determine compliance. Inspection and checking of the criteria consists of investigation, without the use of special equipment or procedures, to determine compliance with requirements and may include comparison of requirements to the vendor supplied product, documentation, and/or information.

Beginning with preliminary categories, the CCDT reviews the initial definition of each category to ensure understanding. The CCDT then looks at each category individually and makes sure each criterion fits into that category. While doing this, the CCDT makes sure that all group members understand the criteria. If necessary, the CCDT rewords the criterion to make it clearer. If any of the criteria do not fit, they are put into a different category or are placed into the miscellaneous category.

After ensuring all criteria fit in the assigned categories, the CCDT determines if the category(ies) needs to be further broken down. If so, the CCDT first looks at the subject headings given to each criteria and groups the criteria using those sub-categories, making sure that the definition of each sub-category is fully understood by each group member. The sub-categories are then adjusted by either combining them with other sub-categories or further breaking them down. These sub-categories are the actual categories used on the STR form. Throughout this process, the CCDT continuously ensures that the category(ies) and sub-categories are appropriately named and that the meanings of the names are understood. This process is repeated for each category, except the "miscellaneous" category.

After all the other categories are completed, the CCDT reviews the miscellaneous category to attempt to place each miscellaneous criterion into an appropriate category. If this is not possible, the criterion is either kept in a general category or placed in a newly created category.

After every criterion is grouped and all categories are fully formed, the criteria matrix 312 is adjusted to include the new groupings and categories. The CCDT reviews the criteria 312 matrix to ensure that all categories are necessary, all criteria are necessary and in the correct category, and that there are no duplicate criteria or categories.

Once the categories are finalized, processing continues to step 606 wherein the CCDT clarifies the criteria for understandability and testability. That is, after the initial development of the test criteria, the CCDT meets to discuss the applicability of each criterion. If any criterion is not fully understood, the source of that criterion is contacted for clarification, or another source is researched for further clarification. This process results in a revised criteria matrix 312.

Continuing to step 608, the (revised) criteria matrix 312 is sent to an internal review team for further analysis. The internal review team reviews and, if necessary, revises the criteria matrix 312. Where possible, the review team seeks assistance from component area experts to help in the review process. A criterion is revised if it is not testable, either manually or by inspection. Often, the need for revision is determined after testing is actually done.

During the internal review, processing continues to step 610. In step 610, the review team determines if the criteria matrix 312 is complete. If the criteria matrix 312 is not complete, processing returns to step 602 for the creation of new criteria. If the criteria matrix 312 is complete, processing continues to step 612.

In step 612, the CCDT automatically updates the create new criteria module 210. In step 612, the CCDT compiles the lessons learned to date and will modify the process as needed based on the lessons learned.

5. Solicit New Software Products—Step 212

Figure 7:
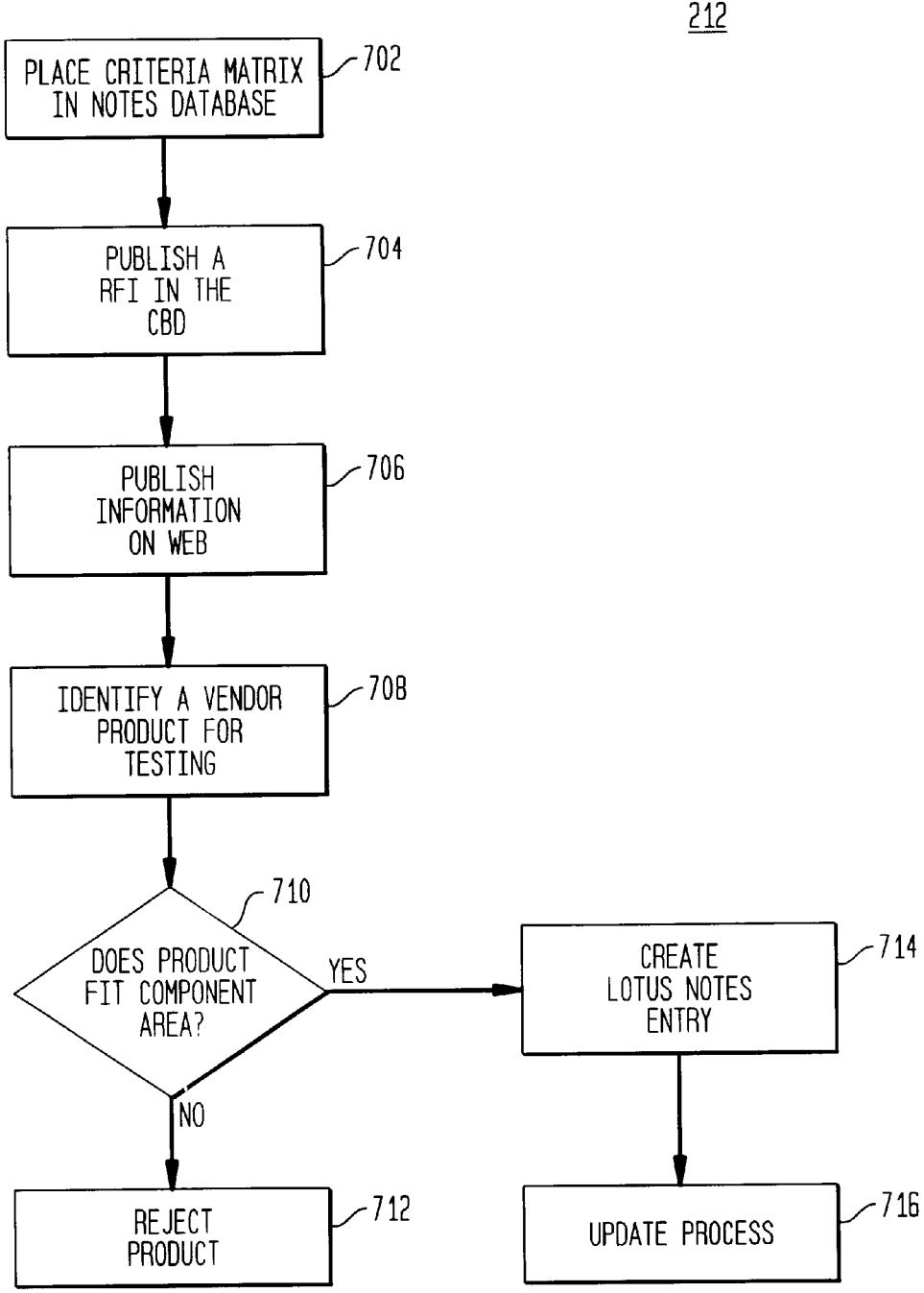
FIG. 7 is a block diagram showing the soliciting new products module.

FIG. 7 is a block diagram showing the soliciting new products module 212. When a complete updated (or revised) criteria matrix 312 is ready and NPLACE 110 is ready to solicit software products for suitability testing from vendors 106, this module 212 is enacted.

Processing begins at step 702 wherein the criteria matrix 312 (which is preferably developed using a word processor) is transferred by a Notes system administrator to the Notes database for testing purposes. The administrator checks for previous version of the criteria matrix, maintains both versions of the criteria matrix 312 while there are test reports using earlier version, and transfers the criteria matrix 312 to the Notes Database.

Processing continues to step 704, wherein the NPLACE 110 center manager writes and publishes a Request for Information (RFI) in the CBD. The RFI calls for the submission by vendors 106 of software products directed to the criteria matrix 312. Vendors 106 are preferably given 30 days to respond to the call for software products.

At the same time as step 704, the NPLACE webmaster performs step 706 writes and places a component area Product Information Form (PIF) on the Web 108. The criteria matrix 312 is finalized and published on the NPLACE 110 homepage incorporating any changes that take place due to comments or continuing work.

Continuing to step 708, the NPLACE 110 marketing team identifies a vendor 106 software product for testing. Vendors 106 can respond to the CBD announcements through a toll-free telephone number or by accessing the NPLACE 110 homepage. NPLACE 110 also researches appropriate software products and then contacts suitable vendors 106 to determine their interest, answer any questions, and encourage their participation. The team must continually check for new versions of software products already tested, and since component area testing is on-going, the teams must keep track of upgrades of software products that have been through the testing process. The team should record likely timelines for upgrades in a vendor record as well as contact the vendors 106 periodically.

Once a software product is submitted, processing continues to step 710, wherein the NPLACE 110 determines whether the software product meets the criteria for the specified component area. Not every software product that is submitted is appropriate for suitability testing. Review of PIF and web site is conducted regularly to decide whether a software product fits the criteria requirements for the component area.

If the software product does not meet the acceptance criteria for the component area, the NPLACE 110 proceeds to step 712 wherein it rejects the software product and writes a software product rejection report. These rejected software products are determined to be not part of the component area. The NPLACE 110 contacts the vendor 106 with concerns about the software product and the parties come to a mutual agreement. Also, the NPLACE 110 determines if the software product might fit another component area. If the software product fits another component area, the NPLACE 110 records the software product in a closed product report If the NPLACE 110 determine in step 710 that the software product fits the component area and is appropriate for suitability testing, processing continues to step 714. In step 714, the NPLACE 110 marketing team creates a Lotus Notes entry with the appropriate vendor 106 information. The team must analyze information (PIF and software product information) to determine if the software product truly fits the component area. If it is deemed appropriate, a Lotus Notes entry is created for that vendor 106 and software product. The entry contains general information about the vendor 106, including the name of the software product, the version, the vendor 106, and the developer. It also contains information about sales, type, and available support for the software product. Processing continues to step 716.

In step 716, the CCDT automatically updates the solicit new software products module 212. In step 716, the CCDT compiles the lessons learned to date and will modify the process as needed based on the lessons learned.

6. Suitability Test Software Product—Step 214

Figure 8:
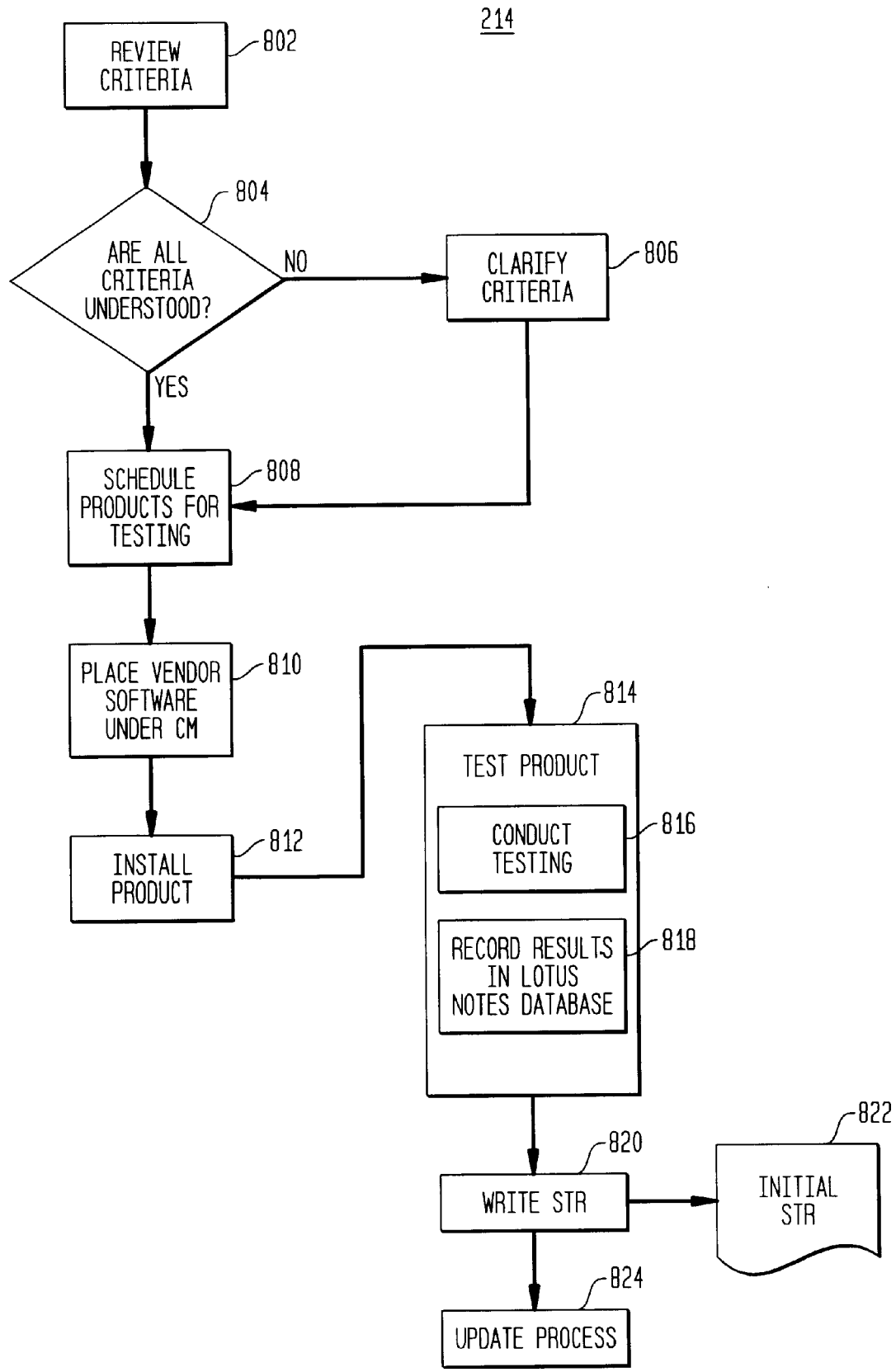
FIG. 8 is a block diagram showing the suitability testing process module.

FIG. 8 is a block diagram showing the suitability testing process module 214. As with the development of test protocols, the suitability testing module 214 requires a disciplined approach to ensure meaningfulness and integrity of the testing process. The procedures listed herein are designed to provide a structured framework for the suitability testing of candidate off-the-shelf software. A team of people is assigned the responsibility of testing software products in a specific component area.

Processing starts in step 802 where the criteria is reviewed. Prior to beginning the actual testing of the software products, the CCDT conducts a thorough review of the criteria matrix 312, test environment/constraints, and criteria clarifications. This review ensures the test team has a good understanding of the component area, the testing environment, and the criteria to be tested. If needed, the CCDT writes clarifications of the criteria, finalizes the testing environment, and writes a testing process for those criteria that can be tested in more than one way.

After the review, processing continues to step 804, wherein the CCDT determines whether all of the criteria is understood. If it is not, processing proceeds to step 806 wherein the criteria is clarified, such as in step 606. Processing then proceeds to step 808. If the CCDT determines that the criteria is understood, processing continues directly to step 808.

In step 808, the NPLACE 110 technical lead takes the list of software products received and formulates a testing schedule, and identifies a designated tester, for the software products in an individual component area.

Processing continues to step 810 wherein a NPLACE 110 information systems specialist places the software product being tested under configuration management (CM). NPLACE 110 must ensure close control over the software product once it has been received. As such, the software and documentation shall remain under control at all times. The NPLACE information systems specialist is responsible for safeguarding the software product.

In operation, the specialist enters software product information in a Lotus Notes database. The log should contain information such as: date of receipt, location of software, Product Information File (PIF), and vendor 106 correspondence. After the specialist has entered the appropriate information about the software product into the log, the software product is turned over to the NPLACE 110 system administration team for installation and loading.

Continuing to step 812, the NPLACE 110 system administrators are responsible for installing the software product to be tested onto the testing platform. Throughout the installation process, Notes are kept on a product-tracking table. The administrators must read the installation procedures, make changes to the platform environment when necessary, call for key codes if necessary, and install the software product on designated testers machine. Furthermore, the following steps are preferably used to install the software product: obtain required licenses, build small scripts to test software product, define and implement expert rules, record test information in the test log, record installation procedures, problems or workarounds that were necessary to install software product, record installation information on the product-tracking table. This table preferably is located on a locked storage cabinet where the software product is to be stored. This table designates the software product's location during testing.

After the software product is installed, processing continues to step 814 wherein the software product is tested for suitability against the criteria matrix 312. This step 814 is composed of two phases. First, the testing team performs two separate tests of the software product in step 816: an inspection test and an operational test. The inspection test involves comparing the test criteria with the vendor-supplied documentation, help files, and on-line help to determine whether or not the software product satisfies these criteria. During the protocol development process, certain test criteria are determined to be appropriate for inspection testing, as opposed to operational testing. This inspection testing is performed at this time.

After the completion of the inspection testing, the test team conducts operational testing of the software product. Prior to the start of the operational testing, the test team reviews the test description (found in Lotus Notes) for this component area. This ensures that the test team is cognizant of the requirements and objectives of this test. The basic steps involved in performing this suitability testing include reviewing the test criteria to ensure there is complete understanding, and reviewing the Product Information Form (PIF) from the vendor 106 to identify areas of concern. If there are any criteria that need to be tested during installation, the testers need to be present and observe the installation performed by the system administrators.

The testing team performs the tests necessary to determine if the criteria are met. While testing, the testing team performs step 818 and makes note of comments to be later entered into the database. These comments can include (but are not limited to): the steps taken in testing, reasons the criteria were not met, and why the criteria were only partially met. For each criteria requirement in the criteria matrix 312, the testing team enters either a "yes" or a "no." The "yes" indicates that the test team was able to confirm that the software product met the criteria. The "no" indicates that the test team was unable to confirm that the software product met the criteria. If clarification is necessary, the explanation column is used Upon completion of testing the software product, the test team proceeds to step 820 wherein it writes an initial Suitability Test Report (STR) 822. The test team inputs the test results (the "yes" and "no" entries for each criteria tested) and the software product information and generates the initial STR 822 that consists of, among other elements, a list of: background information, minimum system requirements, amplifying information, criteria description, test results, test result explanation(s), and a records of lessons learned. The initial STR 822 is preferably stored in a read-only copy in a shared directory. Processing continues to step 824.

In step 824, the CCDT automatically updates the suitability test software products module 214. In step 824, the CCDT compiles the lessons learned to date and will modify the process as needed based on the lessons learned.

7. Review Suitability Test Report—Step 216

Figure 9:
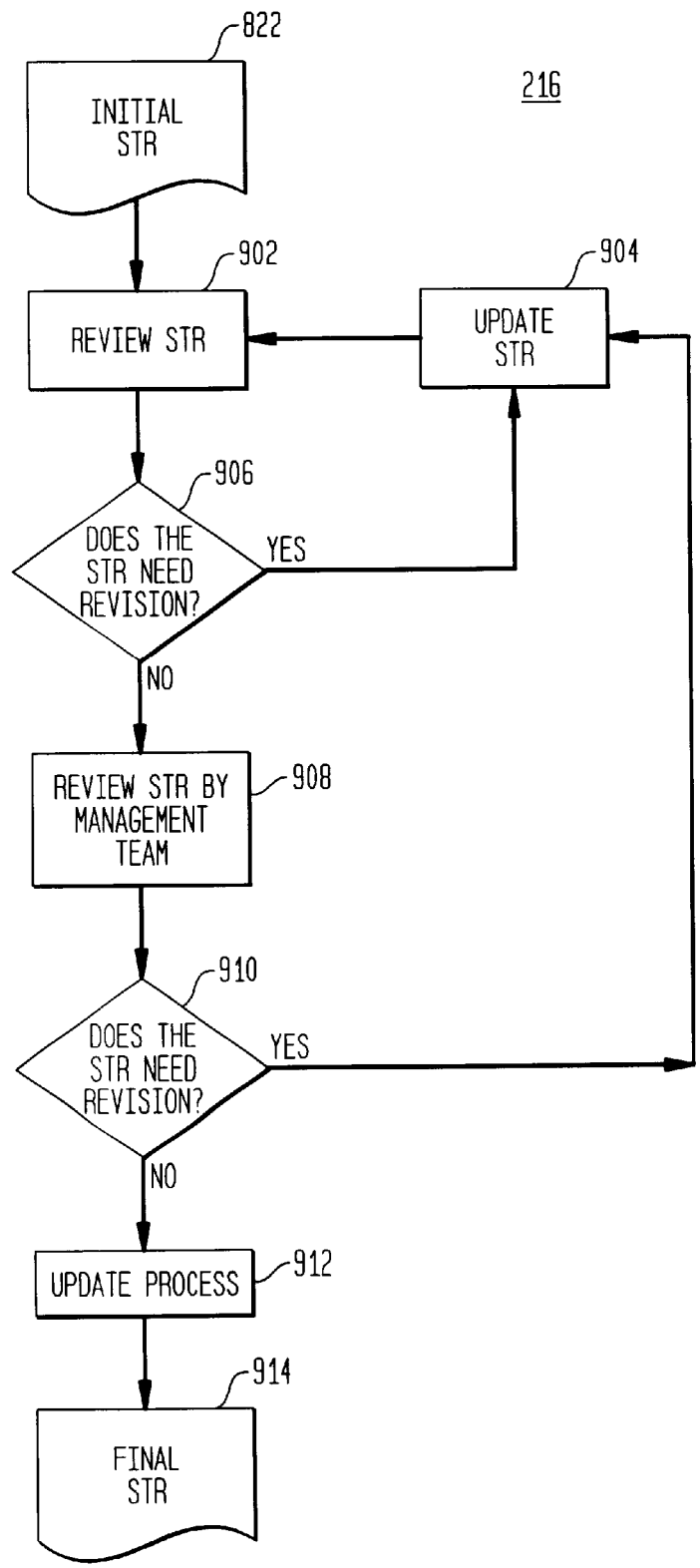
FIG. 9 is a block diagram showing the suitability test report review process module.

FIG. 9 is a block diagram showing the suitability test report (STR) review process module 216. In this module, the initial results of the testing of the software product, as compiled and recorded in the initial STR 822 undergo a detailed review to ensure the accuracy of the report. The STR 822 defines and records the test preparation and test results from the suitability testing of the vendor 106 supplied software product against the predetermined criteria.

Processing begins at step 902 wherein the component area test team (review team) reviews the initial STR 822 prepared by the test team. The test team schedules a review (minimum 3 days) and sends an e-mail invitation (Lotus Notes mail feature) to the review team. The review team members conduct an individual review of the initial STR 822. The review team and test team meet to discuss the review team's initial comments.

During the review, processing continues to step 906 wherein the review team and test team determine if any changes need to be made to the initial STR 822. If changes are needed, processing continues to step 904, wherein the initial STR 822 is updated accordingly such that a revised STR is generated. In step 904, the test team incorporates changes into the Lotus Notes database, regenerates the STR 822 and again stores a read-only copy in the shared directory. The test team notifies the review team that the revised STR is ready for review wherein the review team conducts a final review of the revised STR. The facilitator then provides a reviewed/initialized report to the NPLACE 110 technical lead. Returning to step 906, if no changes are needed, processing continues to step 908.

In step 908, the software management team reviews the revised STR for additional changes. Proceeding to step 910, if the management team determines that changes are needed, processing proceeds to step 904 which is described in detail above. If no changes are needed, processing continues to step 912. In addition, this module 216 outputs a final, vendor-ready STR 914. This final STR 914 is provided to the NPLACE 110 information specialist. Also, a clean copy of the final STR 914, with finalized comments, is produced and given to the NPLACE information systems specialist for filing.

In step 912, the CCDT automatically updates the review suitability test report module 216. In step 912, the CCDT compiles the lessons learned to date and will modify the process as needed based on the lessons learned.

8. Obtain Vendor Disclosure Agreement—Step 218

Figure 10:
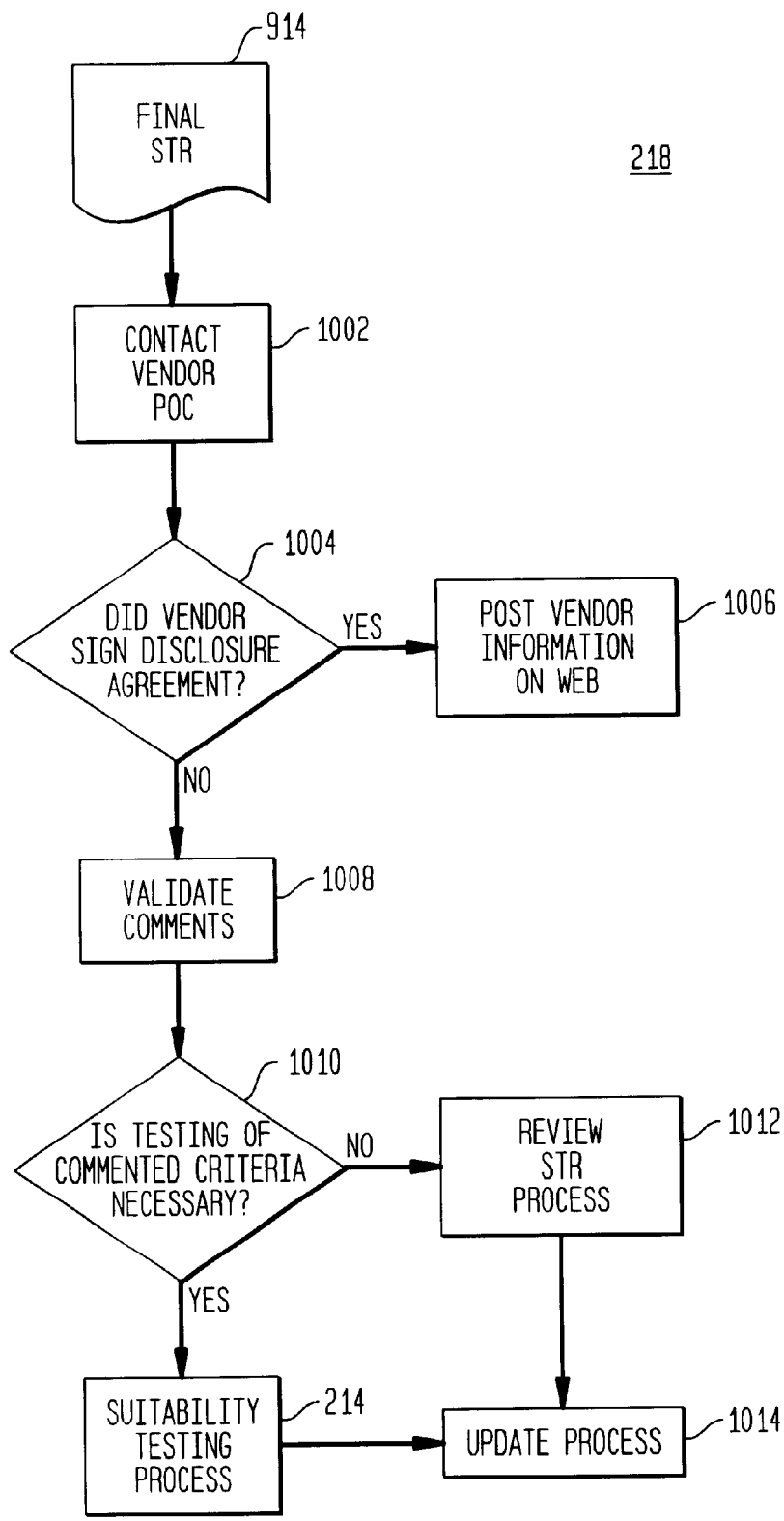
FIG. 10 is a block diagram showing the obtaining vendor disclosure agreement module.

FIG. 10 is a block diagram showing the obtaining vendor disclosure agreement module 918. In this module 918, the NPLACE 110 contacts the vendor 106 of a tested software product to obtain an executed disclosure agreement. The disclosure agreement is a simple agreement wherein the vendor 106 gives NPLACE 110 permission to publish information, including the suitability test results, on the vendor's 106 software product. The vendor's 106 signature is needed on the disclosure agreement before the testing results in the final STR 914 are displayed on the Web 108.

Processing begins at step 1002 wherein the NPLACE 110 information specialist and marketing team prepare the final 914 STR for mailing to the vendor 106 and mail it. The vendor 106 is given about 30 days to sign agreement and/or send comments regarding the content of the final STR 914. The specialist checks periodically on progress by the vendor 106 and encourages the vendor 106 to expedite the process.

After hearing back from the vendor 106, processing proceeds to step 1004 wherein the specialist determines whether the vendor 106 signed the disclosure agreement. If the vendor 106 signed the agreement, processing proceeds to step 1006 wherein the vendor 106 approved final STR 914 is posted on the Web 108. Also, the software product is either destroyed or returned to the vendor 106, at their discretion. In step 1006, the NPLACE 110 checks to see if an old version of the software product has been tested and is on the Web 108. If this is the case—the NPLACE 110 checks with the vendor 106 to see if they are supporting/selling older version. If not, the old version of the software product is remove from the Web 108. Otherwise, the test results of the older version are kept on the Web 108.

The final STR 914 is posted on the Web 108 using well known and conventional Web 108 design and implementation techniques. Also, customers 114 have the option on the NPLACE 110 Web 108 site to compare the final STR 914 from competing software products. Upon making a comparison, the customer 114 is shown a side-by-side comparison of the two or more selected software products for each criteria in the final STRs 914. It would be readily apparent to one of ordinary skill in the relevant art to post the final STR 914 on the Web 108 and to make a comparison of two or more final STRs 914.

Returning to step 1004, if the vendor 106 will not sign the disclosure agreement, processing proceeds to step 1008 wherein the vendor 106 must have disagreed with the NPLACE 110 findings. In step 1008, the NPLACE 110 receives the vendor 106 comments. These comments are reviewed by the test team and the review team to: determine if the vendor's 106 comments are valid, retest the software product, if necessary (may need to re-install the software product), and make any necessary changes to the final STR 914.

Continuing to step 1010, if it is determined that additional testing of the software product is needed, processing proceeds to step 214 which is described in detail above. Upon completion of any additional testing of the software product, processing continues to step 1014.

Returning again to step 1010, if it is determined that no additional testing of the software product is needed, processing proceeds to step 1012 which reviews the STR process in light of the vendor's 106 comments. Processing continues to step 1014.

In step 1014, the CCDT automatically updates the obtain vendor disclosure agreement module 218. In step 1014, the CCDT compiles the lessons learned to date and will modify the process as needed based on the lessons learned.

B. Sample Applications of the Suitability Testing System

The system 100 of the present invention may be used in determining the suitability of any type of off-the-shelf software product, including but not limited to, software for network management, geographical mapping services, word processors, desktop publishers, and database management system software.

The present system 100 was used for determining the suitability testing of four different types of product lines: database management, geographical mapping, network management, and word processing and desktop publishing, each of which is described below. For each suitability testing sample, an overview is given stating the purpose of the testing and the types of criteria for which each software product was evaluated. In some cases, specific criteria requirements are described but this is for convenience only. It would be readily apparent for one of ordinary skill in the relevant art to select different categories of criteria as well as different specific criteria requirements.

1. Database Management Suitability Testing

The database management criteria establishes the functional, performance and verification criteria in five functional areas: File Access, File Management, Database Access, and Database Management. This criteria includes the Defense Information System Agency (DISA), Data Access Services (DAS), and Software Requirements Specification (SRS) requirements.

The functional requirements for database management include: Designed to data community standards, Support for interoperability, Support distributed query processing, Support meta-data maintenance, Support multiple data structures, Support transaction properties of atomicity, consistency, isolation, and durability, Support data backup and recovery (both on line and off line), Support language extensions and server programmability, Provide data security, Provide data system security, Provide data administration tools, Support distributed data systems, and Support multiple data models (i.e., relational, hierarchical, object-oriented).

In this sample, the following software products were compared: Adabas 3.1 (UNIX), Empress (Sun), Empress 8.2 (PC), Empress 8.2 (Sun), Informix (Sun), Oracle 8 (Sun), Pervasive (PC), and Sybase Adaptive Server Enterprise 12.0 (Sun). These software products were compared using the following criteria:

(i) Non-component specific, namely, DII COE compliant; Maintenance/Support provided such as maintenance contract, phone-in support, toll free support, hours/days of support, documentation available, training, and warranty.

(ii) Data Management requirements, namely, provides data access to heterogeneous databases in accordance with Remote Data Access (RDA) Standards; compliant with ANSI/X3.135-1992 SQL and FIPS PUB 127-2; provides a SQL Call Level Interface (CLI); and implementation is compliant with OSF DCE VI 0.2.x; connectivity.

(iii) Data Administration Requirements, namely, installation, configuration, system management, error handling, (iv) Multilevel security, namely, provides basic security features compliant with the DoD TCSEC Class C2 Control Access Protection; provides the capability to store passwords internally in encrypted form; provides the capability to access libraries of data, based on defined source access rights; provides a single login (username, password) for access to multiple data sources; interfaces with existing operating system security and observes all restrictions currently in place; provides security features compliant with the DoD TCSEC Class B1 labeled security protection; supports the sensitivity label data type of the trusted DBMS products; provides the capability to simultaneously process data of various sensitivities and classifications.

(v) Special Features, namely, transaction integrity and management; user interface.

(vi) Language Extensions and Server Programmability, namely, data access and queries; application programming interface.

2. Mapping Services Suitability Testing

The Mapping Services Component Area provides the capability to present and manipulate information in a geographical context. Functional Requirements for this mapping component area include: capture, store, edit, manipulate, retrieve, and display spatial data or geographically referenced data; Comply with DMA and GIS industry data formats (i.e., DTED, DFAD, ARC ADRG); Provide rapid recall of relevant information; Provide clutter/declutter (i.e., filter); Provide icon control of maps and overlays; Provide cartographic computations; Provide interactive spatial operations; Interface with decision support tools; and Provide perspective three-dimensional maps.

In this sample, the following software products were compared: ArcInfo (Sun), ArcView (Sun), Imagine (Sun), MACS (Sun), MapInfo (PC), and OpenMap (Sun). These software products were compared using the following criteria:

(i) Architectural Characteristics, namely, the mapping services processes should be self-contained to allow a potential user to easily evolve their environment to meet changing requirements (modular); the mapping services should distribute its processes among servers or workstations allowing users to configure their particular application to meet different domain requirements and architectures; the mapping services should provide modular, add-on capabilities which can selectively be integrated into specific applications, allowing developers/users to select only that portion of the total functionality they require; and the mapping services should run on a variety of platforms; the mapping services should accommodate a variety of operating systems that include but are not limited to POSIX or POSIT compliant.

(ii) Implementation Constraints, namely, the mapping services should support X11 Release 4 or higher; the mapping services should support Open Systems Foundation/Motif graphical user interface style guide; the mapping services should be POSIX and/or Windows (3.1, 3.11, NT, 95) compliant; and the mapping services should not assume a stand-alone environment, e.g., does not capture system interrupts.

(iii) Security Features.

(iv) Mapping Services Requirements, namely, the mapping services should support standard Defense Mapping Agency (DMA products (ADRG, DCW, WVS, WDBII, DTED) plus the ability to import/register imagery and to support map projections; coordinate transformations between UTM, latitude/longitude, radians and pixels; to support contours, grids, overlays, symbology, screen navigation, various types of drawing capabilities, unit data type representations as specified by the operator, location functions, selection of spatial or attribute data, capabilities to restructure information for display enhancement, raster cell operations, supervised and unsupervised clustering capability; generation of slope, aspect, and sun intensity data categories; 3D and 2D perspective view plots; access to control cursor type and position; access to positions of a cursor; various languages; interfaces to external devices; and to have specific performance requirements.

3. Network Manager Suitability Testing

The Network Manager Component Area provides capabilities in five major functional areas; fault management, configuration management, accounting management, performance management, and security management. The functional requirements for the Network Manager Component Area include:

(i) Fault Management: Provide detection, isolation, and correction of abnormal operation through maintenance of error and traffic logs, trace, isolation, and corrective procedures.

(ii) Configuration Management: Identify all logical and physical network resources, network topology, collect data from all network resources, and analyze all network changes.

(iii) Accounting Management: Calculate resource charges based on the configuration management database.

(iv) Performance Management: Determine network availability and throughput based on accounting and configuration management.

(v) Security Management: Provide basic security services in administration of various network resources.

(vi) Monitor status and report on critical events, such as: Communications Link Status, Communications Link Failure, LAN Component Status, and LAN Failures.

(vii) Notification of Service Restoral, Log communication resource data, event reports, and network performance data.

(viii) Collect and process LAN statistics.

(ix) Report LAN statistics to operator for analysis purposes, such as measuring: Network Throughput, Network Delays, Network Efficiency, and Network Reliability.

(x) Support Ethernet and FDDI physical layers.

(xi) Support TCP/IP and SNMP protocols.

(xii) Provide future growth path to OSI, CMIS/CMIP, and GNMP protocols.

In this sample, the following software products were compared: Command/Post (Sun), KONFIG (Sun), NetExpert (Sun), NetView (PC), and Spectrum (Sun). These software products were compared using the following criteria:

(i) Architectural Characteristics, namely, being capable of working in small (0–50 nodes), medium (50–150 nodes), and large (over 150 nodes) networks; provide a hierarchial view of all devices being managed; allow groupings; allow distributed processing; be capable of running on multiple platforms.

(ii) System Interface Criteria, namely, support a graphical representation of the network and provide interface to access network information.

(iii) Security Features, namely, provide means to identify and authenticate users, and access controls.

(iv) Implementation Constraints, namely, support current POSIX, X-windows or Open Software Foundation (OSF)/MOTIF graphical user style guide.

(v) Configuration Management, namely, capability to define new object types, set parameters, modify relationships, remotely examine device statistics, specify initialization and shutdown parameters, and provide reports and notifications.

(vi) Performance Management, namely, capability to monitor performance and workload, monitor resource allocation, set tuning methods, and generate performance reports.

(vii) Fault Management, namely, capability to monitor and log events and errors, generate reports, manage failures, and execute diagnostic testing.

(viii) Security Management, namely, manage access to different parts of the network, and archive and retrieve security information.

(ix) Accounting Management, namely, capable of recording and generating accounting information, specifying accounting information to be collected, allow for standard procedures to retrieve accounting information and to manage the disposition of the accounting information, select the format the accounting information, provide ability to read accounting limits for communications resources, and allow the operator to define metrics and accounting information units for accountable resources.

(x) General, namely, able to satisfy requirements for at least one year in a multiplatform environment, have proven performance, reliability, and availability characteristics (e.g., mean time between failure, response time to user inputs) and the vendor should be able to provide data supporting characteristic values claimed, should have user manuals, should have proven conformance to Human Factors Engineering (HFE) requirements applicable to an operational command center. (Ref, USAF Human Factors Engineering Guidelines), should provide programmatic interfaces to support detailed requirements, and should have a proven and demonstrable installed base, where the network manager products have been installed in DoD or non-DoD applications in which products could be demonstrated.

4. Word Processors and Desktop Publishing Suitability Testing

The Word Processing & Desktop Publishing Component Area provides the capability to create and modify textual documents. Capabilities normally include importing of graphics, setting of font styles and sizes, creation/modification of paragraph formats, etc. The most common form of interacting with a word processor is through a WYSIWYG (What You See Is What You Get) style of graphic user interface. Many common formats exist for storing documents created with word processors. These include: PostScript, Standard Generalized Markup Language (SGML), EDI, and other vendor specific formats along with ASCII. Desktop Publishing systems are similar in capability to word processors, but include advanced features including the capability to create/edit graphic figures and images within the system, and functionality for specifying the layout of the document.

Functional Requirements for the Word Processing & Desktop Publishing Component Area include: provide a print utility, provide word processing capability for the preparation and editing of record and non-record messages and other user data; and word processing capability will comply with the Standard Generalized Markup Language (SGML) and the ODA/ODIF standards.

In this sample, the following software products were compared: ApplixWare (PC), ApplixWare (Unix), Framemaker 5.5 (PC), Framemaker 5.5 (UNIX), Word 97 (PC), WordPerfect (Unix), WordPerfect 8 (PC), and WordPro (PC). These software products were compared using the following criteria:

(i) Non-Component Specific, namely, DII COE compliant, Maintenance/Support provided, documentation, training, Year 2000 compliance, supports different platforms and windows environment, (ii) Standards Compliance, namely, exhibits compliance with Standard Generalized Markup Language (SGML) standard (FIPS Pub 152, September 1988), office document architecture, Office Document Interchange Format (ODA/ODIF) standard (ISO 8613,1989), and operates under the Open System Interconnection (OSI) standard.

(iii) Installation, namely, allows the administrator to specify path and directory information, supports 16×16, 32×22, and 64×64 icons, allows customization of installation.

(iv) Security Features, namely, can create, send and/or store material for future review/reproduction which is sensitive or is labeled to reflect a given classification level, supports operation on a high assurance platform (B1 or greater), provides a capability to facilitate detection of known types of software viruses specific to product, provides a capability to configure its macro language facility.

(v) User Interface Mechanics, namely, supports access to multiple documents, utilizes a pointing device (e.g., mouse or pen), provides a status bar and control keys, supports conventional user interface controls.

(vi) File Management Capability, namely, provides file-naming conventions and a file management menu.

(vii) Print Management, namely, allows user to select different print devices and to select conventional print job management.

(viii) Document Preparation Capability, namely, provide conventional document controls such as create, modify, save, text editing functions, table functions, character functions, graphics capabilities, and page/document setup.

(ix) Data Import/Export Functions, namely, imports and exports of documents in various formats such as ASCII, Microsoft Word, Rich Text Format, etc., and imports various graphic formats such as PICT, PICT2, EPS, TIFF (TIFF R and G), GIF, PCX, CGM, BMP, PBM, XWD, PCL, and map formats.

(x) Tools Provided, namely, provides conventional capabilities such as thesaurus, grammar checker, spelling checker, label generation capability, and search capabilities.

CONCLUSION

While various embodiments of the present invention have been described above, it should be understood that they have been presented by the way of example only, and not limitation. It will be understood by those skilled in the art that various changes in form and details may be made therein without departing from the spirit and scope of the invention as defined. Thus, the breadth and scope of the present invention should not be limited by any of the above-described exemplary embodiments.

What is claimed is:

1. A method for testing software suitability of a software product for specific functionality in a component area, comprising the steps of:

(a) establishing functional criteria of the component area of the software product, thereby generating a criteria matrix;

(b) performing suitability tests on the software product against said functional criteria; and (c) publishing results from said suitability tests.

2. The method according to claim 1, wherein said step (b) comprises the steps of:

(b)(1) performing an inspection test of the software product; and (b)(2) performing an operational test of the software product.

3. The method according to claim 1, further comprising the steps of:

(d) reviewing said results from said suitability tests; and (e) obtaining a disclosure agreement from a vendor of the software product.

4. The method according to claim 1, wherein the component area of the software product is selected from the group consisting of: database management system software, network management software, geographical mapping software, wordprocessing software, and desktop publishing software.

5. The method according to claim 1, wherein said criteria matrix contains one or more general criteria requirements and one or more component area specific criteria requirements.

6. The method according to claim 1, wherein said step (c) publishes said results on a global computer network, and further comprising the step of:

(d) accessing said results from said global computer network by a customer.

7. The method according to claim 6, further comprising the step of:

(e) comparing said results of suitability tests on the software product with a second result of a second suitability tests performed on a second software product against said functional criteria.

8. A software suitability testing system, comprising:

a means for receiving at least one system requirement from a customer that defines a functional component area of a target software system;

a means for generating one or more criteria requirements for said functional component area, thereby creating a criteria matrix;

a means for gathering information about a software product from a vendor for said functional component area;

a means for performing suitability testing on said software product; and a means for generating a software suitability testing report for said software product showing whether said software product satisfies each said criteria requirements of said criteria matrix.

9. The software suitability testing system according to claim 8, further comprising:

a means for publishing said software suitability testing report for said software product.

10. The software suitability testing system according to claim 9, wherein said software suitability testing report is published on a global computer network.

11. The software suitability testing system according to claim 8, further comprising a means for comparing said software suitability testing report for said software product with a second software suitability testing report for a second software product.

12. The software suitability testing system according to claim 8, wherein said means for performing suitability testing on said software product comprises an inspection test and an operational test.

13. The software suitability testing system according to claim 8, wherein said functional component area of said software product is selected from the group consisting of: database management system software, network management software, geographical mapping software, wordprocessing software, and desktop publishing software.

14. The software suitability testing system according to claim 8, wherein said criteria matrix contains one or more general criteria requirements and one or more component area specific criteria requirements.

* * * * *

UNITED STATES PATENT AND TRADEMARK OFFICE
CERTIFICATE OF CORRECTION

PATENT NO. : 6,766,481 B2 Page 1 of 1
APPLICATION NO. : 10/131918
DATED : July 20, 2004
INVENTOR(S) : Estep et al.

It is certified that error appears in the above-identified patent and that said Letters Patent is hereby corrected as shown below:

"The U.S. Government has a paid-up license in this invention and the right in limited circumstances to require the patent owner to license others on reasonable terms as provided for by the terms of Contract No. FA872704C002 awarded by the United States Air Force."

Signed and Sealed this

Twenty-ninth Day of August, 2006

JON W. DUDAS
*Director of the United States Patent and Trademark Office*